(12) United States Patent
Tanaka

(10) Patent No.: US 9,045,700 B2
(45) Date of Patent: Jun. 2, 2015

(54) METHOD FOR UPGRADING FT SYNTHESIS OIL, AND MIXED CRUDE OIL

(75) Inventor: Yuichi Tanaka, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENINEERING CO., LTD., Tokyo (JP)

(*) Notice: Subject to any disclaimer, the term of this patent is extended or adjusted under 35 U.S.C. 154(b) by 452 days.

(21) Appl. No.: 13/138,272

(22) PCT Filed: Jan. 21, 2010

(86) PCT No.: PCT/JP2010/000329
§ 371 (c)(1),
(2), (4) Date: Sep. 27, 2011

(87) PCT Pub. No.: WO2010/087133
PCT Pub. Date: Aug. 5, 2010

(65) Prior Publication Data
US 2012/0006720 A1 Jan. 12, 2012

(30) Foreign Application Priority Data
Jan. 30, 2009 (JP) ................. 2009-020856

(51) Int. Cl.
*C10G 2/00* (2006.01)
*C10G 3/00* (2006.01)
(Continued)

(52) U.S. Cl.
CPC *C10G 2/342* (2013.01); *C10G 2/30* (2013.01); *C10G 3/42* (2013.01); *C10G 45/00* (2013.01);
(Continued)

(58) Field of Classification Search
CPC . C10G 67/00; C10G 67/02; C07C 1/00–1/12; C07C 1/20; C07C 1/207; C07C 1/2076
USPC ............ 518/726; 585/733–734, 750; 208/14, 208/17, 133–134
See application file for complete search history.

(56) References Cited

U.S. PATENT DOCUMENTS

| 6,268,401 | B1 | 7/2001 | Cook et al. |
| 2002/0169220 | A1 | 11/2002 | Moore, Jr. et al. |

(Continued)

FOREIGN PATENT DOCUMENTS

| CN | 1125960 | 7/1996 |
| CN | 1898364 | 1/2007 |

(Continued)

OTHER PUBLICATIONS

Gary, J.H. et al. (2007). Petroleum Refining Technology and Economics, 5th ed, Taylor & Francis, 465 pgs (Office action references Figure 1.1 on p. 3).*

(Continued)

*Primary Examiner* — Brian McCaig
(74) *Attorney, Agent, or Firm* — Kenyon & Kenyon LLP

(57) ABSTRACT

A method for upgrading a synthesis oil synthesized by the Fisher-Tropsch synthesis reaction, the method includes: a hydroisomerization step of hydroisomerizing the synthesis oil to remove alcohols and olefins, and converting at least a portion of normal paraffins with a carbon number of 5 or more into isoparaffins to obtain a hydroisomerized synthesis oil; a crude oil mixing step of mixing the hydroisomerized synthesis oil with a crude oil to obtain a mixed crude oil; a mixed crude oil transferring step of transferring the mixed crude oil to a crude oil distillation unit of a refinery; and a mixed crude oil refining step of processing the transferred mixed crude oil in petroleum refining facilities of the refinery including at least the crude oil distillation unit.

3 Claims, 11 Drawing Sheets

(51) Int. Cl.
| | |
|---|---|
| *C10G 45/00* | (2006.01) |
| *C10G 45/58* | (2006.01) |
| *C10G 7/00* | (2006.01) |
| *C10G 67/00* | (2006.01) |
| *C10G 67/02* | (2006.01) |
| *C07C 1/00* | (2006.01) |
| *C07C 1/02* | (2006.01) |
| *C07C 1/04* | (2006.01) |
| *C07C 1/06* | (2006.01) |
| *C07C 1/08* | (2006.01) |
| *C07C 1/10* | (2006.01) |
| *C07C 1/12* | (2006.01) |
| *C07C 1/20* | (2006.01) |
| *C07C 1/207* | (2006.01) |

(52) U.S. Cl.
CPC ........ *C10G 45/58* (2013.01); *C10G 2300/1022* (2013.01); *C10G 2300/304* (2013.01); *C10G 3/50* (2013.01); *C10G 3/56* (2013.01); *C10G 7/00* (2013.01); *C10G 2300/1044* (2013.01)

(56) References Cited

U.S. PATENT DOCUMENTS

2007/0267327 A1\* 11/2007 Boakye .................. 208/253

2010/0276334 A1\* 11/2010 Lenglet et al. .................. 208/14

FOREIGN PATENT DOCUMENTS

| EP | 0321303 | \* | 6/1989 | ............. C10G 45/60 |
| FR | 2909097 | \* | 5/2008 | ............... C10G 2/00 |
| JP | 2003-531008 | | 10/2003 | |
| JP | 2004-323626 | | 11/2004 | |
| WO | 01/46339 | | 6/2001 | |
| WO | 03/078550 | | 9/2003 | |
| WO | 2006/003119 | | 1/2006 | |

OTHER PUBLICATIONS

International Search Report dated Feb. 16, 2010 issued in corresponding PCT Application No. PCT/JP2010/000329.
Amadi et al. "Measurement of the Wax Appearance Temperature of Gas-to-Liquids Products, Alaska North Slope Crude, and their Blends," Energy Sources, Jul. 1, 2005, 27(9), p. 831-838.
Singleton et al. "Produce diesel from gas," Hydrocarbon Processing, May 1983, 62(5), p. 71-74.
Extended European Search Report dated Oct. 17, 2013 issued in corresponding EP Application No. 10 73 5605.
Chinese Search Report dated Jun. 21, 2013 issued in corresponding Chinese Application No. 201080005831.8. [With English Translation].

\* cited by examiner

METHOD FOR UPGRADING FT SYNTHESIS OIL, AND MIXED CRUDE OIL

TECHNICAL FIELD

The present invention relates to a method for upgrading an FT synthesis oil synthesized by Fisher-Tropsch synthesis reaction to produce liquid fuels, such as naphtha, kerosene, gas oil, and heavy oil, and various products, such as wax and asphalt, and a mixed crude oil obtained by mixing the FT synthesis oil with a crude oil.

This application is a national stage application of International Application No. PCT/JP2010/000329, filed Jan. 21, 2010, which claims priority to Japanese Application No. 2009-020856, filed Jan. 30, 2009, which is incorporated herein by reference in its entirety.

BACKGROUND ART

As one method for synthesizing liquid fuels from a natural gas, a GTL (Gas To Liquids: liquid fuel synthesis) technique of reforming a natural gas to produce a synthesis gas containing a carbon monoxide gas (CO) and a hydrogen gas ($H_2$) as main components, synthesizing a synthesis oil (hereinafter referred to as "FT synthesis oil") composed of a hydrocarbon mixture by using this synthesis gas as a source gas by the Fischer-Tropsch synthesis reaction (hereinafter referred to as "FT synthesis reaction"), and further hydroprocessing and fractionating the FT synthesis oil to produce liquid fuels and other products, such as naphtha (raw gasoline), kerosene, gas oil, and wax, has recently been developed. Since the liquid fuel products using this FT synthesis oil as a feedstock have high paraffin content, and almost no sulfur components, for example, as shown in Patent Document 1, the liquid fuel products attract attention as an environmentally friendly fuel. However, since special facilities are required in order to produce liquid-fuel products from the FT synthesis oil, utilization of the FT synthesis oil has been limited.

Additionally, since the FT synthesis oil obtained by the FT synthesis reaction contains a lot of normal paraffins, and has properties that the freezing point is high, and the fluidity is low, it is not possible to transfer FT synthesis oil by a pump, etc. at ambient temperature and it is difficult to handle the FT synthesis oil. Thus, Patent Document 2 suggests a technique of mixing this FT synthesis oil (FT wax) with a crude oil at a specific temperature, thereby uniformly dispersing the FT wax in the crude oil as fine crystals, forming a mixture which can be pumped at a surrounding temperature, and then transporting this mixture.

CITATION LIST

[Patent Document]
[Patent Document 1] Japanese Patent Unexamined Publication No. 2004-323626
[Patent Document 2] PCT Japanese Translation Patent Publication No. 2003-531008

SUMMARY OF INVENTION

Technical Problem

Meanwhile, although an ordinary crude oil has deviations depending on the drilling area, as shown in FIG. 6, the normal paraffin content tends to be relatively small. On the other hand, most of the above-described FT synthesis oil, as shown in FIG. 3, is composed of normal paraffins except for a small amount of olefins and alcohols which are by-products of the FT synthesis reaction. For this reason, in a case where this FT synthesis oil is mixed with a crude oil as it is, the properties of the mixed crude oil are greatly different from those of the original crude oil. As a result, in a case where this mixed crude oil is refined in a refinery, handling it in the same way as an ordinary crude oil is impossible.

Additionally, in a mixture obtained by uniformly dispersing an FT wax in a crude oil as fine crystals, which is disclosed in the Patent Document 2, the pour point elevates greatly as compared with the crude oil even in a case where the FT wax is mixed in a ratio of over 10 percent with respect to the crude oil, as described in Table 1 of the Patent Document 2. Accordingly, in the mixture in which the FT synthesis oil is mixed at a high blending ratio, transfer of the FT synthesis oil at a surrounding temperature is difficult in practice. Additionally, in a case where this mixture is transferred during heating, the temperature of the mixture must be kept at a temperature lower than the solution temperature of the dispersed FT wax crystals, temperature control within a narrow range is required, and the handling is difficult. In addition, this technique is not based on the assumption that the FT wax is converted into liquid fuels but that the FT wax is utilized as wax after transport by making the best use of the feature that the FT wax is hard.

The present invention was made in view of the aforementioned circumstances, and the object thereof is to provide a method for upgrading an FT synthesis oil capable of producing liquid fuels and other products from the FT synthesis oil Obtained by the FT synthesis reaction by using facilities of an existing refinery without requiring large-scale special facilities, and a mixed crude oil composed of the FT synthesis oil with high content and crude oil, capable of being processed in the facilities of the above refinery.

Solution To Problem

In order to solve the above problem and achieve such an object, the present invention suggests the following methods.

The method for upgrading a synthesis oil of the present invention is a method for upgrading a synthesis oil synthesized by the Fisher-Tropsch synthesis reaction. The method includes a hydroisomerization step of hydroisomerizing the synthesis oil to convert at least a portion of normal paraffins with a carbon number of 5 or more into isoparaffins as well as to remove alcohols and olefins, and to obtain a hydroisomerized synthesis oil; a crude oil mixing step of mixing the hydroisomerized synthesis oil with crude oil to obtain a mixed crude oil; a mixed crude oil transferring step of transferring the mixed crude oil to a crude oil distillation unit of a refinery; and a mixed crude oil refining step of processing the transferred mixed crude oil in petroleum refining facilities of the refinery including at least the crude oil distillation unit.

In the method for upgrading the synthesis oil having this configuration, the FT synthesis oil is hydroisomerized so that at least a portion of the normal paraffins with a carbon number of 5 or more is converted into isoparaffins, as well as alcohols and olefins included in the FT synthesis oil are removed, and a hydroisomerized synthesis oil is produced. Thus, it is possible to adjust the content ratio of the normal paraffins and the isoparaffins in the hydroisomerized synthesis oil by controlling the degree of the hydroisomerization. For this reason, it is possible to lower the freezing point of the hydroisomerized synthesis oil, the FT synthesis oil can be mixed with the crude oil at an arbitrary ratio at ambient temperature, and the properties of the mixed crude oil obtained by mixing the FT synthesis oil with the crude oil can be prevented from being greatly different from the properties of the original crude oil. Also, since the mixed crude oil is transferred to the crude oil distillation unit of the refinery, and is processed in petroleum-refining facilities of the refinery including at least the crude oil distillation unit, it is possible to produce liquid fuels, such as gasoline, kerosene, gas oil, and heavy oil, and various products, such as wax and asphalt, through ordinary processing in the refinery from the mixed crude oil, that is, indirectly from the FT synthesis oil.

Here, the freezing point of the hydroisomerized synthesis oil may be set to 60° C. or lower in the hydroisomerization step.

In this case, the hydroisomerized synthesis oil obtained by hydroisomerizing the FT synthesis oil keeps a liquid state even at a temperature near ambient temperature so that the fluidity is secured and the ease of handling is significantly improved. Additionally, if the freezing point of the hydroisomerized synthesis oil is 60° C. or lower, it is possible to transport the hydroisomerized synthesis oil by an ordinary heat-retaining ship.

Additionally, if the freezing point of the hydroisomerized synthesis oil is 40° C. or lower, it is possible to mix the hydroisomerized synthesis oil with liquid crude oil in an arbitrary ratio at ambient temperature. Moreover, if the freezing point of the hydroisomerized synthesis oil is 30° C. or lower, it is possible to handle the hydroisomerized synthesis oil itself as a liquid at ambient temperature.

In addition, here, the freezing point means a freezing point measured by a method based on JIS K 2269.

Additionally, it is preferable that the content of the normal paraffins with a carbon number of 20 or more in the hydroisomerized synthesis oil is set to 40 mass % or less on the basis of the mass of the hydroisomerized synthesis oil in the hydroisomerization step.

In this case, since the content of the normal paraffins is reduced, it is possible to lower the freezing point of the hydroisomerized synthesis oil, the FT synthesis oil can be mixed with the crude oil in an arbitrary ratio at an ambient temperature, the properties of a mixed crude oil obtained by mixing the FT synthesis oil with the crude oil can be prevented from being greatly different from the properties of the original crude oil, and the processing in the refinery can be properly performed.

In addition, the freezing point of the hydroisomerized synthesis oil can be set to 60° C. or lower by setting the content of the normal paraffins with a carbon number of 20 or more in the hydroisomerized synthesis oil to 40 mass % or less. Moreover, the freezing point of the hydroisomerized synthesis oil can be set to 30° C. or lower by setting the content of the normal paraffins with a carbon number of 20 or more in the hydroisomerized synthesis oil to 20 mass % or less.

The mixed crude oil according to the present invention is a mixed crude oil obtained by mixing a synthesis oil synthesized by the Fisher-Tropsch synthesis reaction with a crude oil. Here, a hydroisomerized synthesis oil obtained by hydroisomerizing the synthesis oil, in which at least a portion of normal paraffins with a carbon number of 5 or more is converted into isoparaffins as well as alcohols and olefins are removed, is mixed with crude oil.

In the mixed crude oil having this composition, a hydroisomerized synthesis oil in which at least a portion of normal paraffins with a carbon number of 5 or more is converted into isoparaffins as well as alcohols and olefins in the FT synthesis oil are removed, is mixed with a crude oil. Thus, the hydroisomerized synthesis oil can be mixed in an arbitrary ratio at an ambient temperature, and the properties of the mixed crude oil can be prevented from being greatly different from the properties of an original crude oil. Accordingly, it is possible to perform normal processing in the refinery, thereby producing liquid fuels, such as naphtha, kerosene, gas oil, and heavy oil, and various products, such as wax and asphalt.

Here, the freezing point of the hydroisomerized synthesis oil may be 60° C. or lower.

Additionally, the content of normal paraffins with a carbon number of 20 or more in the hydroisomerized synthesis oil may be 40 mass % or less.

Advantageous Effects of Invention

According to the present invention, it is possible to provide a method for upgrading an FT synthesis oil capable of producing liquid fuels and other products from the FT synthesis oil by using the facilities of an existing refinery without requiring large-scale special facilities, and it is possible to provide a mixed crude oil composed of the FT synthesis oil with high content and crude oil, capable of being processed in the facilities of the above refinery.

DESCRIPTION OF EMBODIMENT

Hereinafter, a preferred embodiment of the present invention will be described with reference to the accompanying drawings. In a method for upgrading an FT synthesis oil and a mixed crude oil according to the present embodiment, an FT synthesis oil, which is obtained by producing a synthesis gas including a carbon monoxide gas (CO) and a hydrogen gas ($H_2$) as main components from a natural gas and by performing the FT synthesis reaction by using this synthesis gas as a source gas, is used.

Figure 1:
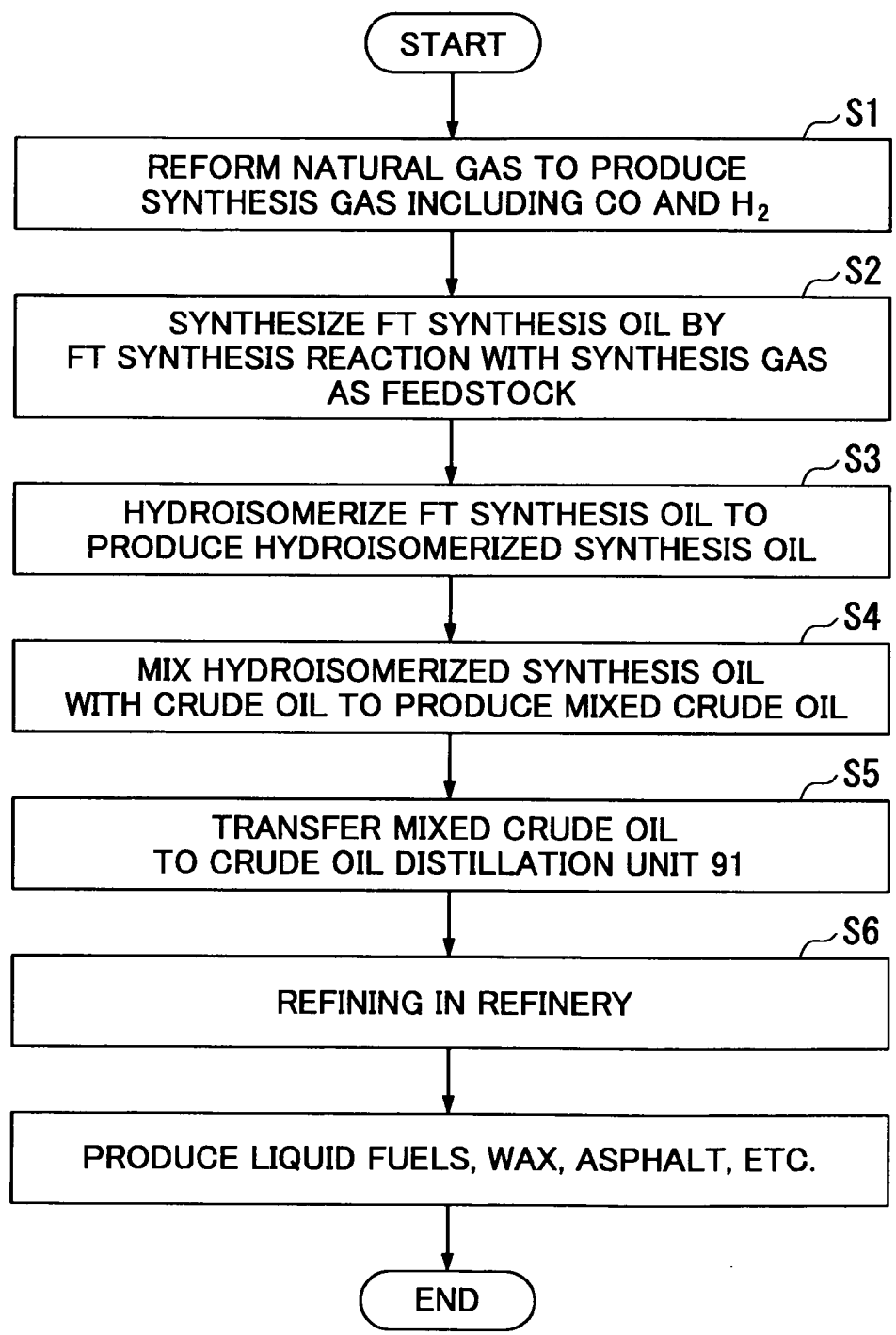
FIG. 1 is a flow chart showing a method for upgrading an FT synthesis oil according to an embodiment of the present invention.

First, the outline of the method for upgrading an FT synthesis oil that is the embodiment of the present invention will be described with reference to a flow chart shown in FIG. 1.

First, a natural gas is reformed to produce a synthesis gas including a carbon monoxide gas (CO) and a hydrogen gas ($H_2$) as main components (synthesis gas producing step S1).

The FT synthesis reaction is performed using this synthesis gas (CO+$H_2$) as a feedstock, thereby synthesizing an FT synthesis oil (FT synthesis reaction step S2).

Hydroisomerization is performed to the synthesized FT synthesis oil by using a hydrogen gas and a catalyst so that at least a portion of the normal paraffins with a carbon number of 5 or more is converted into isoparaffins as well as alcohols and olefins included in the FT synthesis oil are removed, and a hydroisomerized synthesis oil is obtained (hydroisomerization step S3). Here, in the present embodiment, the freezing point of the hydroisomerized synthesis oil is set to 60° C. or lower, and the content of the normal paraffins with a carbon number of 20 or more in the hydroisomerized synthesis oil is set to 40 mass % or less on the basis of the mass of the hydroisomerized synthesis oil.

In addition, a hydroisomerization apparatus performing the hydroisomerization step S3 may be provided, for example, after an ordinary FT synthesis unit provided onshore, after an FT synthesis unit provided together on a platform of a marine natural gas field, or on a tanker ship used when FT synthesis oil and crude oil are transported.

Next, this hydroisomerized synthesis oil and a crude oil (mineral-based crude oil) drilled from the ground or the like are mixed together to produce a mixed crude oil (crude oil mixing step S4). Here, the mixing ratio of the hydroisomerized synthesis oil in the mixed crude oil can be arbitrarily set. However, in the present embodiment, the content of the hydroisomerized synthesis oil based on the mass of the mixed crude oil is set to 50 mass %. Here, although a method for mixing the hydroisomerized synthesis oil and the crude oil is not particularly limited, arbitrary methods which are usually implemented, such as, line blending and tank blending, can be adopted.

The obtained mixed crude oil is transferred to a crude oil distillation unit 91 in a refinery which will be described later (mixed crude oil transferring step S5). Here, although a method for transferring a mixed crude oil is not particularly limited, methods which are usually implemented, such as, for example, pipeline transfer onshore, and tanker transfer, can be adopted.

In the crude oil distillation unit 91, the mixed crude oil is fractionally distilled, and the obtained respective fractions are processed if necessary in various facilities of the refinery, thereby producing various products (mixed crude oil refining step S6).

In this way, liquid fuels, such as naphtha, kerosene, gas oil, and heavy oil, and various products, such as wax and asphalt, are produced from the FT synthesis oil.

Next, the overall configuration and steps of an FT synthesis oil upgrading system 1 in which the method for upgrading FT synthesis oil and the mixed crude oil that are the embodiment of the present invention are used will be described with reference to FIG. 2.

Figure 2:
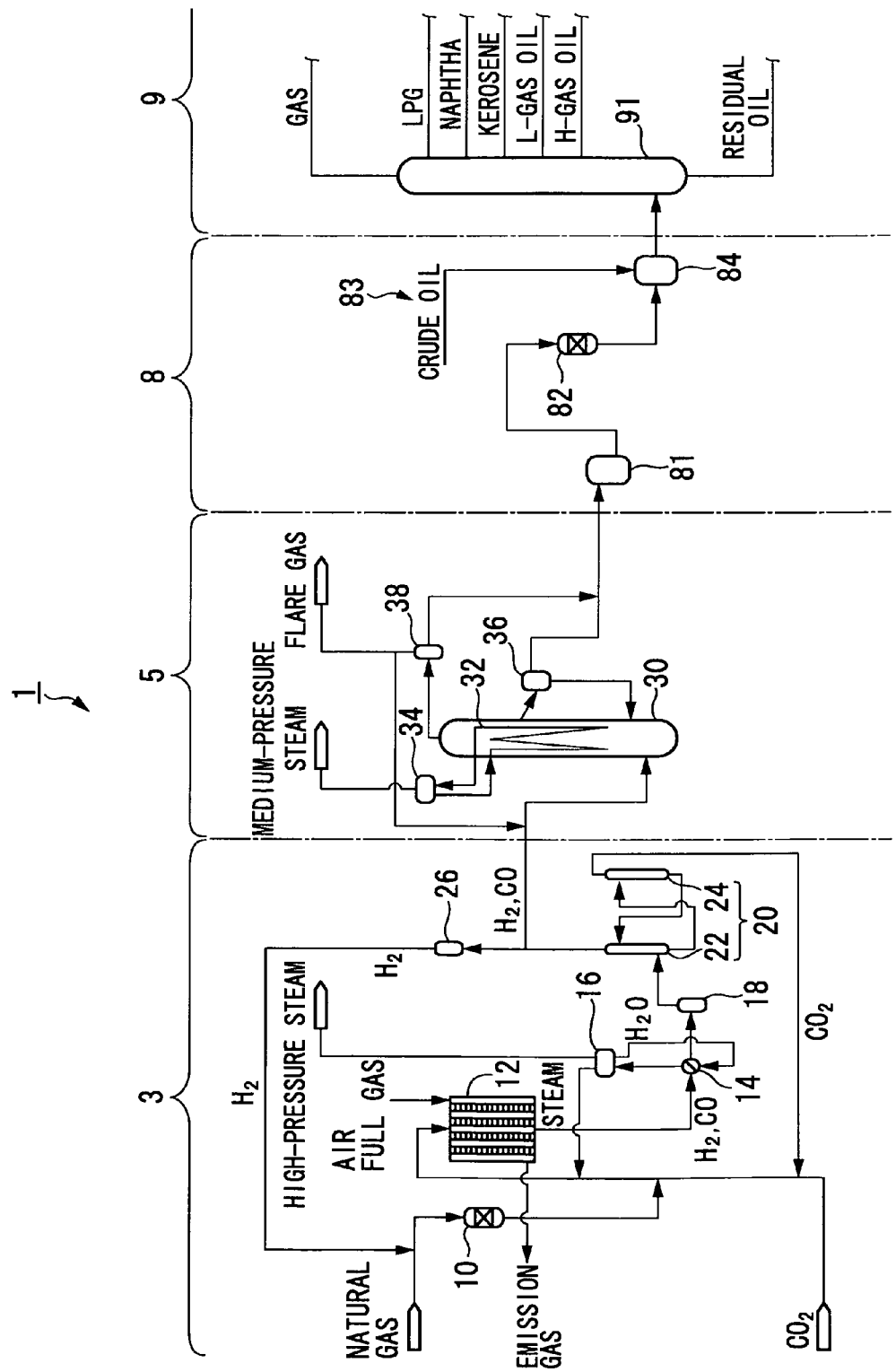
FIG. 2 is a schematic diagram showing the overall configuration of a hydrocarbon synthesizing system used for the method for upgrading an FT synthesis oil according to the embodiment of the present invention.

As shown in FIG. 2, the FT synthesis oil upgrading system 1 according to the present embodiment includes a synthesis gas production unit 3, an FT synthesis unit 5, a mixed crude oil production unit 8, and a refinery unit 9.

The synthesis gas production unit 3 reforms a natural gas, which is a hydrocarbon feedstock, to produce a synthesis gas including a carbon monoxide gas and a hydrogen gas. That is, the synthesis gas production unit 3 is a unit which performs the synthesis gas producing step S1 in FIG. 1.

The FT synthesis unit 5 synthesizes liquid hydrocarbons by the FT synthesis reaction from the produced synthesis gas. That is, the FT synthesis unit 5 is a unit which performs the FT synthesizing step S2 in FIG. 1.

The mixed crude oil production unit 8 hydroisomerizes the FT synthesis oil synthesized by the FT synthesis reaction to produce a hydroisomerized synthesis oil, and mixes this hydroisomerized synthesis oil with a crude oil to produce a mixed crude oil. That is, the mixed crude oil production unit 8 is a unit which performs the hydroisomerization step S3, the crude oil mixing step S4, and the mixed crude oil transferring step S5, in FIG. 1.

The refinery unit 9 refines the above mixed crude oil to produce liquid fuels, such as naphtha, kerosene, gas oil, and heavy oil, and various products, such as wax and asphalt. That is, the refinery unit 9 is a unit which performs the mixed crude oil refining step S6 in FIG. 1.

Hereinafter, components of these respective units will be described.

The synthesis gas production unit 3 mainly includes a desulfurization reactor 10, a reformer 12, a waste heat boiler 14, vapor-liquid separators 16 and 18, a $CO_2$ removal unit 20, and a hydrogen separator 26.

The desulfurization reactor 10 is composed of, for example, a hydrodesulfurizer, and removes sulfur components from the natural gas that is a feedstock.

The reformer 12 reforms the natural gas supplied from the desulfurization reactor 10, to produce a synthesis gas including a carbon monoxide gas (CO) and a hydrogen gas ($H_2$) as main components.

The waste heat boiler 14 recovers waste heat of the synthesis gas produced in the reformer 12, to generate a high-pressure steam.

The vapor-liquid separator 16 separates the water heated by the heat exchange with the synthesis gas in the waste heat boiler 14 into gas (high-pressure steam) and liquid.

The vapor-liquid separator 18 removes condensed components from the synthesis gas cooled down in the waste heat boiler 14, and supplies a gas component to the $CO_2$ removal unit 20.

The $CO_2$ removal unit 20 has an absorption tower 22 which removes a carbon dioxide gas from the synthesis gas supplied from the vapor-liquid separator 18 by using an absorbent, and a regeneration tower 24 which strips the carbon dioxide gas from the absorbent including the carbon dioxide gas to regenerate the absorbent.

The hydrogen separator 26 separates a portion of the hydrogen gas included in the synthesis gas in which the carbon dioxide gas has been separated by the $CO_2$ removal unit 20.

It is to be noted herein that the above $CO_2$ removal unit 20 is not necessarily provided depending on circumstances.

The FT synthesis unit 5 mainly includes, for example, a bubble column reactor (a bubble column type hydrocarbon synthesis reactor) 30, a vapor-liquid separator 34, a separator 36, and a vapor-liquid separator 38.

The bubble column reactor 30, which is an example of a reactor which synthesizes liquid hydrocarbons from a synthesis gas, functions as an FT synthesis reactor which synthesizes liquid hydrocarbons (FT synthesis oil) from the synthesis gas by the FT synthesis reaction. The bubble column reactor 30 includes, for example, a bubble column slurry bed type reactor in which a slurry having solid catalyst particles suspended in liquid hydrocarbons (product of the FT synthesis reaction) is contained inside a column type vessel. The bubble column reactor 30 makes the synthesis gas (carbon monoxide gas and hydrogen gas) produced in the above synthesis gas production unit 3 react to synthesize liquid hydrocarbons.

The vapor-liquid separator 34 separates the water circulated and heated through a heat transfer pipe 32 disposed in the bubble column reactor 30 into steam (medium-pressure steam) and liquid.

The separator 36 separates the catalyst particles and liquid hydrocarbons in the slurry contained inside the bubble column reactor 30.

The vapor-liquid separator 38 is connected to the top of the bubble column reactor 30 to cool down the unreacted synthesis gas and gaseous hydrocarbon products.

The mixed crude oil production unit 8 mainly includes a storage tank 81, a hydroisomerization reactor 82, a crude oil supply section 83, and a mixing tank 84.

The storage tank 81 is connected to the separator 36 and vapor-liquid separator 38 of the FT synthesis unit 5, and stores a heavy component of the FT synthesis oil drawn from the separator 36, and a light component of the FT synthesis oil drawn from the vapor-liquid separator 38.

The hydroisomerization reactor 82 hydroisomerizes the FT synthesis oil supplied from the storage tank 81 to produce a hydroisomerized synthesis oil.

The crude oil supply section 83 brings a crude oil (mineral-based crude oil) taken from the ground or the like to the mixing tank 84.

The mixing tank 84 mixes the hydroisomerized synthesis oil brought from the hydroisomerization reactor 82 with the crude oil brought from the crude oil supply section 83.

The refinery unit 9, which is an ordinary refinery facility which refines a crude oil, refines the crude oil to produce liquid fuels, such as naphtha, kerosene, gas oil, and heavy oil, and various products, such as wax and asphalt. The refinery unit 9 is provided with a crude oil distillation unit 91 which fractionally distills hydrocarbon compounds with various compositions according to boiling points. Also, although not shown, a group of processing units which refine various hydrocarbon fractions fractionated in the crude oil distillation unit 91 are provided.

Next, the steps of producing liquid fuels, such as naphtha, kerosene, gas oil, and heavy oil, and various products, such as wax and asphalt, from a natural gas by the FT synthesis oil upgrading system 1 having the configuration described above will be described.

A natural gas (whose main component is $CH_4$) as a hydrocarbon feedstock is supplied to the FT synthesis oil upgrading system 1 from an external natural gas supply source (not shown), such as a natural gas field or a natural gas plant. The above synthesis gas production unit 3 reforms this natural gas to produce a synthesis gas (a mixed gas including a carbon monoxide gas and a hydrogen gas as main components).

First, the above natural gas is supplied to the desulfurization reactor 10 along with the hydrogen gas separated by the hydrogen separator 26. The desulfurization reactor 10 converts sulfur components included in the natural gas using the hydrogen gas into hydrogen sulfide by a hydrodesulfurization catalyst, and adsorbs and removes the produced hydrogen sulfide by, for example, ZnO. By desulfurizing the natural gas in advance in this way, the catalysts used in the reformer 12, the bubble column reactor 30 or the like can be prevented from being deactivated due to sulfur components.

The natural gas desulfurized in this way is supplied to the reformer 12 after being mixed with the carbon dioxide ($CO_2$) gas supplied from a carbon-dioxide supply source (not shown) and the steam generated in the waste heat boiler 14. The reformer 12 reforms the natural gas by using a carbon dioxide and a steam to produce a high-temperature synthesis gas including a carbon monoxide gas and a hydrogen gas as main components, for example, by the steam and carbon-dioxide-gas reforming method.

The high-temperature synthesis gas (for example, 900° C., 2.0 MPaG) produced in the reformer 12 in this way is supplied to the waste heat boiler 14, and is cooled down (for example, to 400° C.) by the heat exchange with the water which circulates through the waste heat boiler 14. At this time, the water heated by the synthesis gas in the waste heat boiler 14 is supplied to the vapor-liquid separator 16. From this vapor-liquid separator 16, a gas component is supplied to the reformer 12 or other external devices as a high-pressure steam (for example, 3.4 to 10.0 MPaG), and water as a liquid component is returned to the waste heat boiler 14. Thereby, the waste heat from the high-temperature synthesis gas is recovered.

Meanwhile, the synthesis gas cooled down in the waste heat boiler 14 is supplied to the absorption tower 22 of the $CO_2$ removal unit 20, or the bubble column reactor 30, after condensed fractions are separated and removed in the vapor-liquid separator 18. The absorption tower 22 absorbs a carbon dioxide gas included in the synthesis gas within the contained absorbent, to separate the carbon dioxide gas from the synthesis gas. The absorbent including the carbon dioxide gas within this absorption tower 22 is introduced into the regeneration tower 24, the absorbent including the carbon dioxide gas is subjected to stripping treatment by, for example, heating with a steam, and the stripped carbon dioxide gas is brought to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio suitable for the FT synthesis reaction (for example, $H_2:CO_2=2:1$ (molar ratio)).

Additionally, a portion of the synthesis gas, in which the carbon dioxide gas has been separated by the above $CO_2$ removal unit 20, is also supplied to the hydrogen separator 26. The hydrogen separator 26 separates the hydrogen gas included in the synthesis gas, by the adsorption and desorption (hydrogen PSA) utilizing a pressure difference. The separated hydrogen is continuously supplied from a gas holder (not shown) or the like via a compressor (not shown) to various hydrogen-utilizing reactors (for example, the desulfurization reactor 10, the hydroisomerization reactor 82 and so on) which perform predetermined reactions utilizing hydrogen within the FT synthesis oil upgrading system 1.

Next, the above FT synthesis unit 5 synthesizes liquid hydrocarbons (FT synthesis oil) by the FT synthesis reaction from the synthesis gas produced in the above synthesis gas production unit 3.

The synthesis gas produced in the above synthesis gas production unit 3 flows into the bottom of the bubble column reactor 30, and rises through the slurry contained in the bubble column reactor 30. At this time, within the bubble column reactor 30, the carbon monoxide and hydrogen gas which are included in the synthesis gas react with each other by the aforementioned FT synthesis reaction, thereby generating hydrocarbons. Moreover, by circulating water through the heat transfer pipe 32 of the bubble column reactor 30 at the time of this synthesis reaction, the reaction heat of the FT synthesis reaction is removed, and the water heated by this heat exchange is vaporized into a steam. As for this steam, the water liquefied in the vapor-liquid separator 34 is returned to the heat transfer pipe 32, and a gas component is supplied to external apparatuses as a medium-pressure steam (for example, 1.0 to 2.5 MPaG).

The liquid hydrocarbons synthesized in the bubble column reactor 30 in this way are introduced into the separator 36 along with catalyst particles as slurry. The separator 36 separates the slurry into a solid component, such as catalyst particles, and a liquid component including liquid hydrocarbons. A portion of the separated solid component, such as the catalyst particles, is returned to the bubble column reactor 30, and a liquid component (FT synthesis oil) is brought to the mixed crude oil production unit 8. Additionally, the unreacted synthesis gas, and the produced hydrocarbons which are gaseous under the conditions of the bubble column reactor 30 are introduced into the vapor-liquid separator 38 from the top of the bubble column reactor 30. The vapor-liquid separator 38 cools down these gases to separate condensed liquid hydrocarbons and bring the separated hydrocarbons to the mixed crude oil production unit 8. Meanwhile, the gas component separated by the vapor-liquid separator 38, i.e., a mixed gas including the unreacted synthesis gas (CO and $H_2$) and hydrocarbon gas with a low carbon number ($C_4$ or less) as main components is recycled to the bubble column reactor 30, and the unreacted synthesis gas included in the mixed gas is subjected to the FT synthesis reaction again. In addition, for the purpose of preventing gaseous hydrocarbons composed mainly of $C_4$ or less from being accumulated at high concentration within an FT synthesis reaction system due to the recycling of the mixed gas, some of the mixed gas is not recycled to the bubble column reactor 30, but is introduced into an external combustion facility (a flare stack (not shown)), is combusted, and then emitted to the atmosphere.

The FT synthesis oil brought to the mixed crude oil production unit 8 is contained in the storage tank 81, and is supplied to the hydroisomerization reactor 82. In the hydroisomerization reactor 82, the FT synthesis oil is hydroisomerized using the hydrogen gas supplied from the above hydrogen separator 26, so that at least a portion of the normal paraffin with a carbon number of 5 or more is converted into isoparaffin as well as alcohols and olefins included in the FT synthesis oil are removed, and the hydroisomerized synthesis oil is obtained. In this hydroisomerization reaction, the normal paraffins are converted into isoparaffins by using a catalyst and heat.

The hydroisomerized synthesis oil produced in the hydroisomerization reactor 82 is brought to the mixing tank 84. Additionally, a crude oil (mineral-based crude oil) drilled from the ground or the like is brought from the crude oil supply section 83 to the mixing tank 84 where the hydroisomerized synthesis oil and the crude oil are mixed together to produce a mixed crude oil.

The mixed crude oil obtained as described above is transferred to the crude oil distillation unit 91 of the refinery unit 9. Here, although a method for transferring a mixed crude oil to the refinery unit 9 is not particularly limited, arbitrary methods which are usually implemented, such as pipeline transfer onshore, tanker transfer or the like can be adopted. In the crude oil distillation unit 91, the mixed crude oil is fractionated, thereby obtaining, for example, emission gas, LPG a naphtha fraction, a kerosene fraction, a light gas oil fraction, a heavy gas oil fraction, residual oil. Then, LPG is recovered as an LPG product by a recovery unit. The naphtha fraction, the kerosene fraction, the light gas oil fraction, and the heavy gas oil fraction are subjected to various kinds of processing, respectively, and liquid-fuel products, such as gasoline, kerosene, and gas oil (diesel fuel oil) are produced. The residual oil is subjected to, for example, desulfurization treatment, and is made into various products, such as heavy oil and asphalt.

Figure 3:
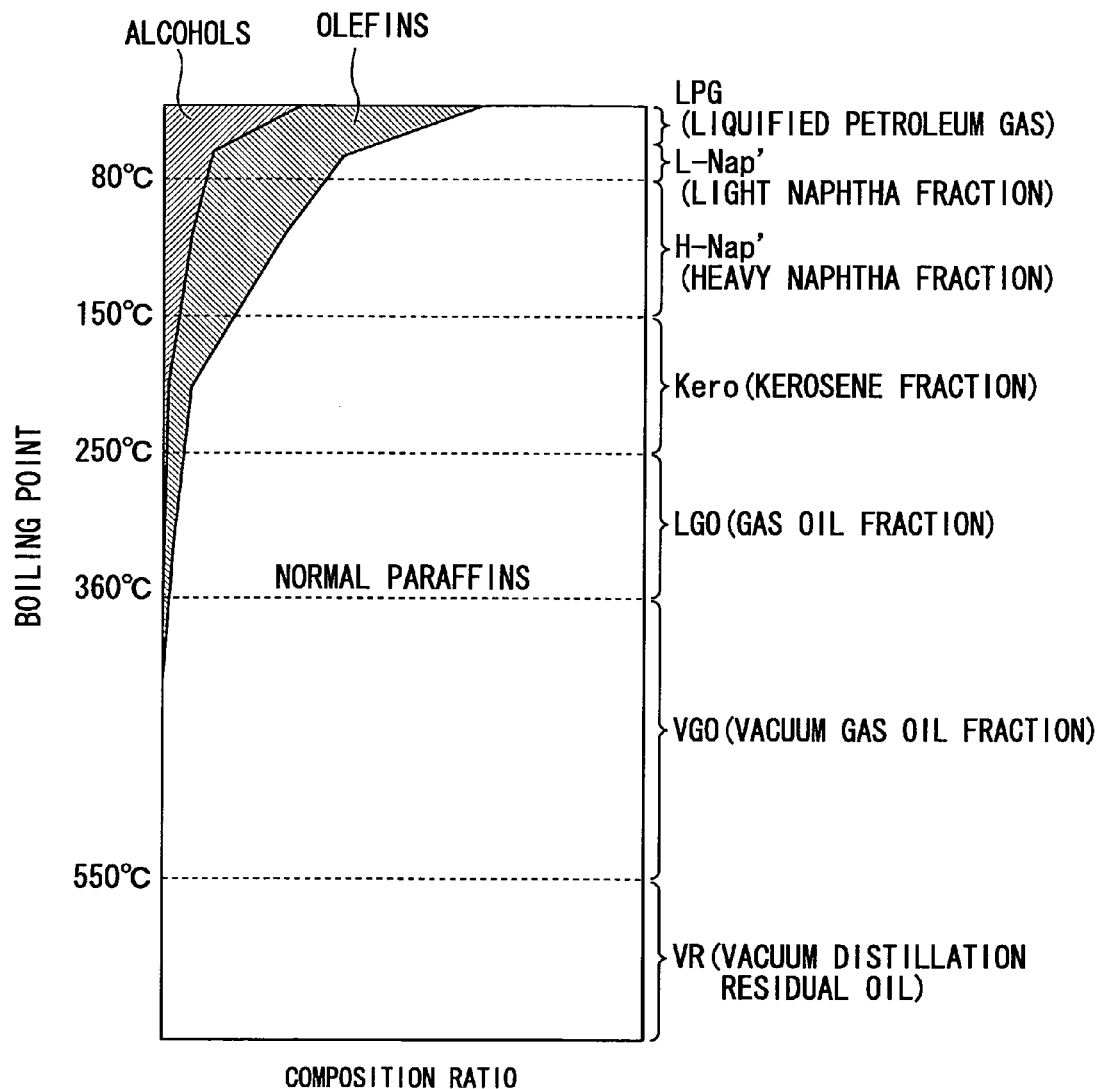
FIG. 3 is an explanatory view showing the composition of the FT synthesis oil.

Here, the composition of the FT synthesis oil synthesized in the FT synthesis unit 5 (FT synthesis reaction step S2) is shown in FIG. 3. As shown in FIG. 3, most of the FT synthesis oil except for small amounts of alcohols and olefins is composed of normal paraffins. For this reason, the freezing point is high, and the fluidity is low near the ambient temperature.

Figure 4:
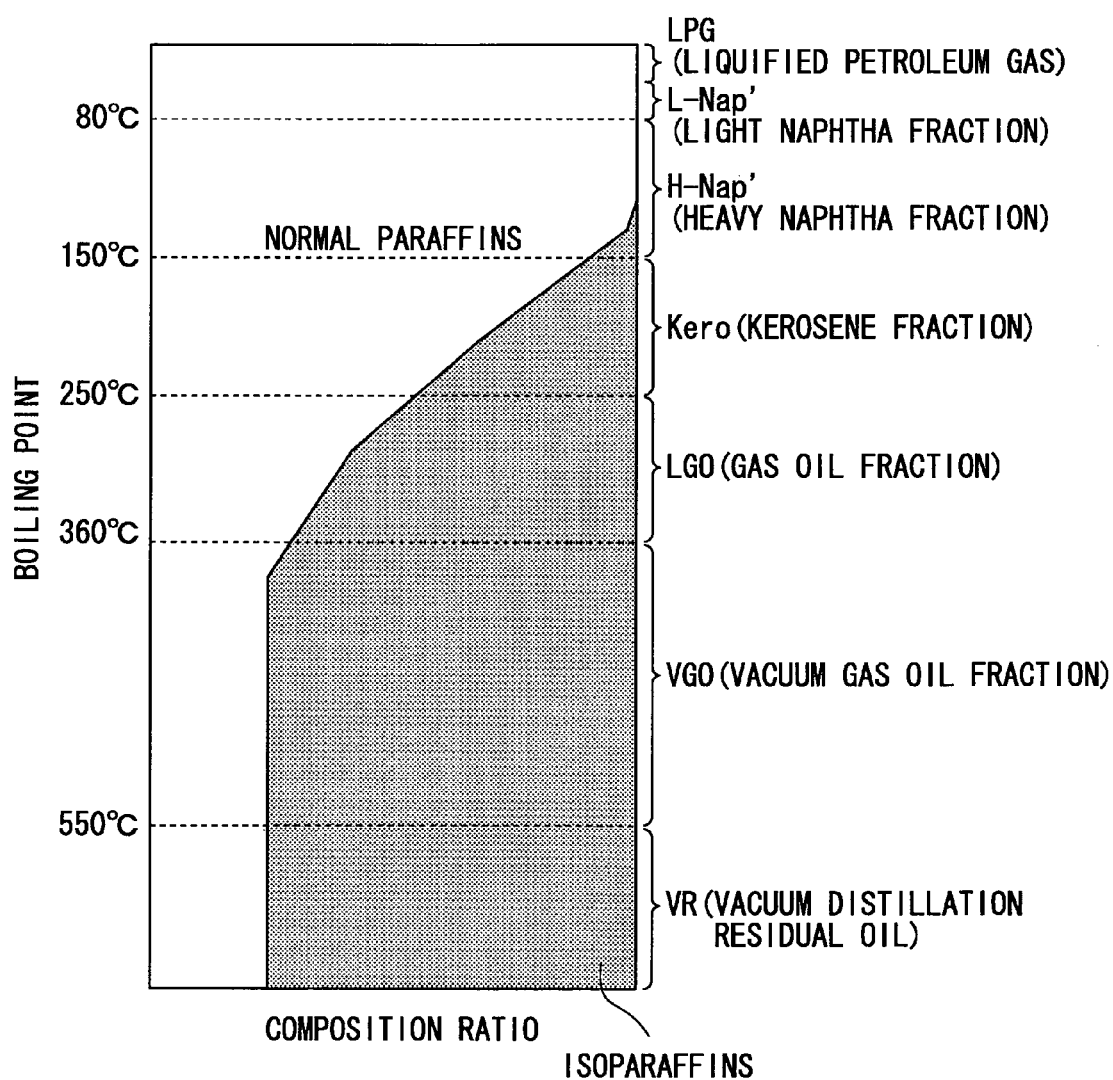
FIG. 4 is an explanatory view showing the composition of the hydroisomerized synthesis oil.

The composition of hydroisomerized synthesis oil obtained by hydroisomerizing this FT synthesis oil is shown in FIG. 4. As shown in FIG. 4, the olefins which have existed in the FT synthesis oil are converted into paraffins by hydrogenation, and the alcohols are converted into paraffins by hydrodeoxygenation. Simultaneously, at least a portion of the normal paraffins is converted into isoparaffins. In particular, about 50 percent of the heavy normal paraffins are converted into isoparaffins. Here, in the present embodiment, the freezing point of the hydroisomerized synthesis oil is set to 60° C. or lower, and the content of the normal paraffins with a carbon number of 20 or more in the hydroisomerized synthesis oil is set to 40 mass % or less.

Figure 5A:
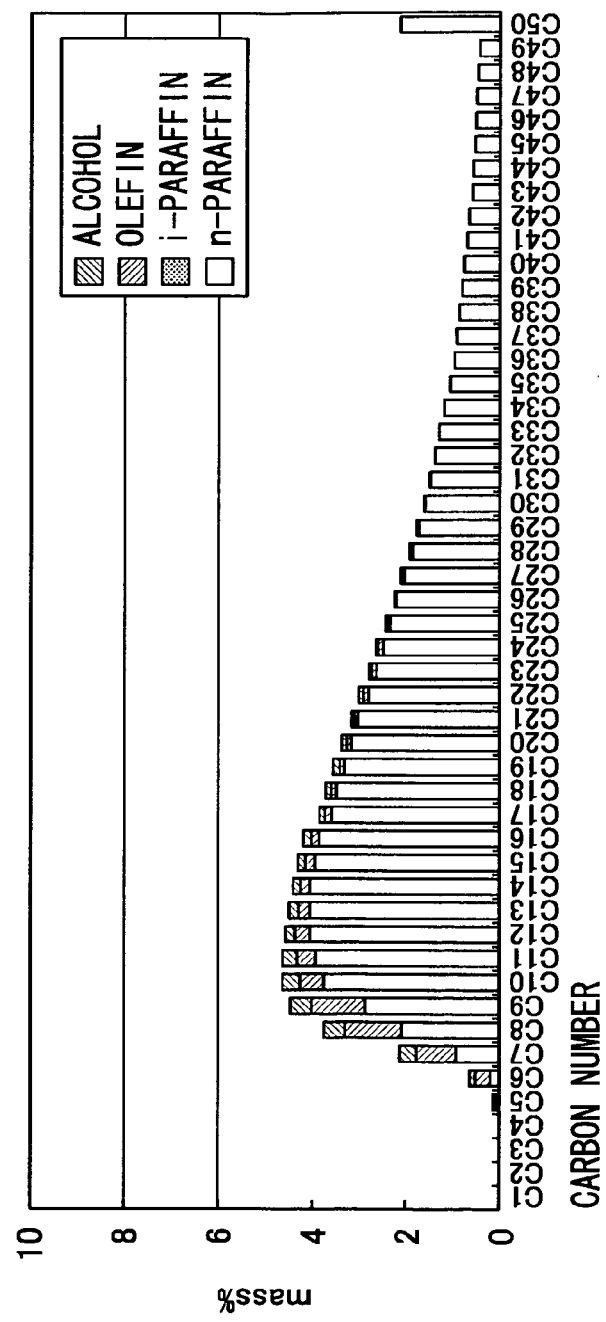
FIG. 5A is a view showing the composition of the FT synthesis oil before hydroisomerization for explaining a change in composition before and after the hydroisomerization.
Figure 5B:
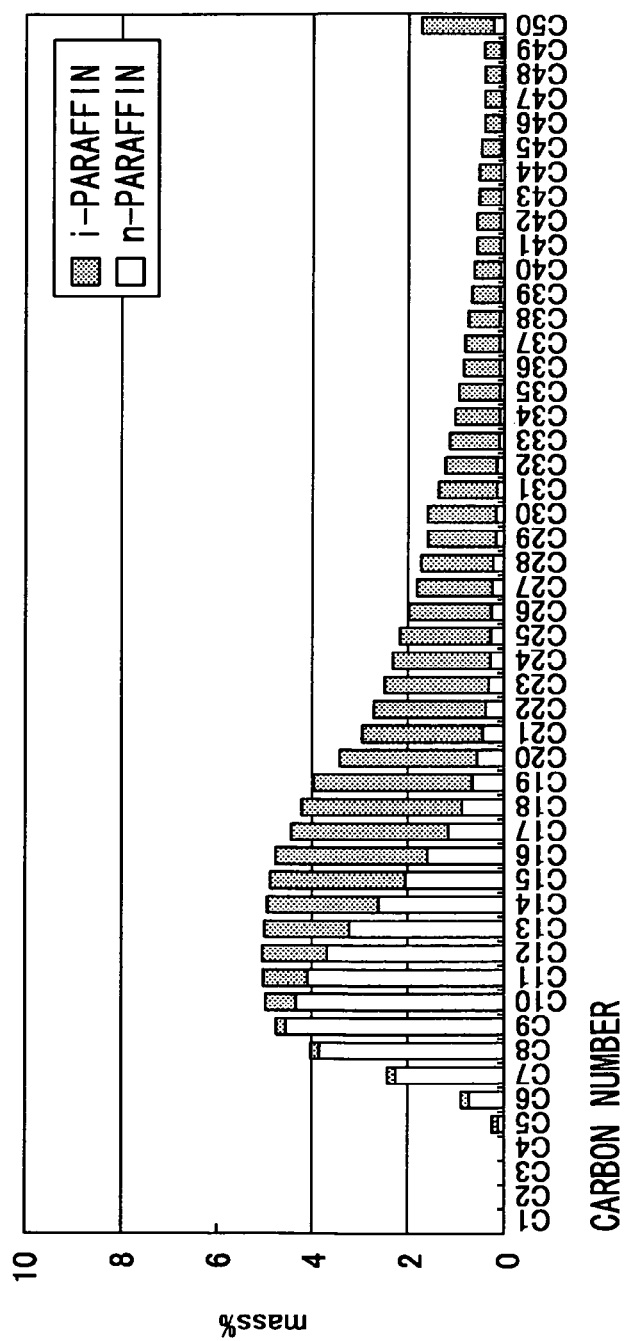
FIG. 5B is a view showing the composition of the hydroisomerized synthesis oil after hydroisomerization for explaining a change in composition before and after the hydroisomerization.

A change in composition before and after hydroisomerization is shown in FIGS. 5A and 5B. FIG. 5A shows the composition before the hydroisomerization, i.e., the composition of the FT synthesis oil produced in the FT synthesis unit 5. FIG. 5B shows the composition after the hydroisomerization, i.e., the composition of the hydroisomerized FT synthesis oil hydroisomerized in the hydroisomerization reactor 82.

The FT synthesis oil contains alcohols and olefins and so on, in a region with a carbon number of 24 or less, and a region with a carbon number of 25 or more is composed of normal paraffins.

Meanwhile, in the hydroisomerized synthesis oil, alcohols and olefins are not included at all, and much of the normal paraffins are converted into isoparaffins. Additionally, the hydroisomerized synthesis oil is lightened as a whole.

In addition, the conditions of the hydroisomerization of the FT synthesis oil are not particularly limited, as far as at least a portion of the normal paraffins with a carbon number of 5 or more in the FT synthesis oil is isomerized into isoparaffins, and preferably, the freezing point of the hydroisomerized synthesis oil is set to 60° C. or lower, and the content of the normal paraffins with a carbon number of 20 or more is set 40 mass % or less, as described above. However, it is preferable to perform the hydroisomerization under the following conditions.

Hydroisomerization reactor 82, which may be well-known fixed bed flow type reactor filled with a predetermined hydroisomerization catalyst, hydroisomerizes the FT synthesis oil. Here, the hydroisomerization includes conversion of olefins into paraffins by hydrogenation, conversion of alcohols into paraffins by hydrodeoxygenation, and decomposition of isoparaffins into light hydrocarbons or the like, as well as isomerization of normal paraffins into isoparaffins, as mentioned above.

The hydroisomerization catalyst includes, for example, a catalyst in which a metal, as an active metal, belonging to the 8th group, the 9th group, and the 10th group of the periodic table is carried on a support including a solid acid. In addition, the periodic table of elements means the long period type periodic table of elements based on the regulations of IUPAC (International Union of Pure and Applied Chemistry).

A suitable support includes a support including one or more kinds of solid acid selected from amorphous metal oxides having thermal resistance, such as silica alumina, silica zirconia, and alumina boria.

The catalyst support can be produced by molding a mixture including the above solid acid and a binder, and then calcining the mixture. The composition ratio of the solid acid is preferably 1 to 70 mass % and more preferably 2 to 60 mass %, on the basis of the total quantity of the support.

Although the binder is not particularly limited, alumina, silica, silica alumina, titania, and magnesia are preferable, and alumina is more preferable. The composition ratio of the binder is preferably 30 to 99 mass % and more preferably 40 to 98 mass %, on the basis of the total quantity of the support.

The calcining temperature of the mixture is preferably within a range of 300 to 550° C., more preferably within a range of 350 to 530° C., and still more preferably within a range of 400 to 530° C.

The metals belonging to the 8th group, the 9th group, and the 10th group specifically include cobalt, nickel, rhodium, palladium, iridium, platinum, etc. It is preferable to use one kind of metal independently or use two or more kinds of metals in combination, which is/are selected from nickel, palladium, and platinum among these metals.

These metals can be carried on the aforementioned support by conventional methods, such as impregnation and ion exchange. Although the amount of a metal to be carried is not particularly limited, it is preferable that the total quantity of the metal to the support is 0.1 to 3.0 mass %.

Additionally, the hydroisomerization of the FT synthesis oil can be performed under the following reaction conditions. The hydrogen partial pressure is preferably 0.5 to 12 MPa, and more preferably 1.0 to 5.0 MPa. The liquid hourly space velocity (LHSV) of the middle distillate is preferably 0.1 to 10.0 h$^{-1}$, and more preferably 0.3 to 3.5 h$^{-1}$. Although not particularly limited, the hydrogen gas/oil ratio is preferably 50 to 1000 NL/L, and more preferably 70 to 800 NL/L.

In addition, in the present specification, the "liquid hourly space velocity (LHSV)" means the volumetric flow rate of the feed oil in the standard condition (25° C. and 101325 Pa) per the capacity of a catalyst bed, and the unit "h$^{-1}$" represents the reciprocal of time (hour). Additionally, "NL" that is the unit of hydrogen capacity in the hydrogen/oil ratio represents hydrogen capacity (L) in the normal condition (0° C. and 101325 Pa).

Additionally, the reaction temperature in the hydroisomerization is preferably 180 to 400° C., more preferably 200 to 370° C., still more preferably 250 to 350° C., and much more preferably 280 to 350° C.

Here, if the reaction temperature exceeds 400° C., a side reaction decomposing hydrocarbons into a light fraction increases, and this is not preferable. On the other hand, if the reaction temperature falls below 180° C., this is not preferable because the progress of the hydroisomerization becomes insufficient, and alcohols remains without being removed.

Figure 6:
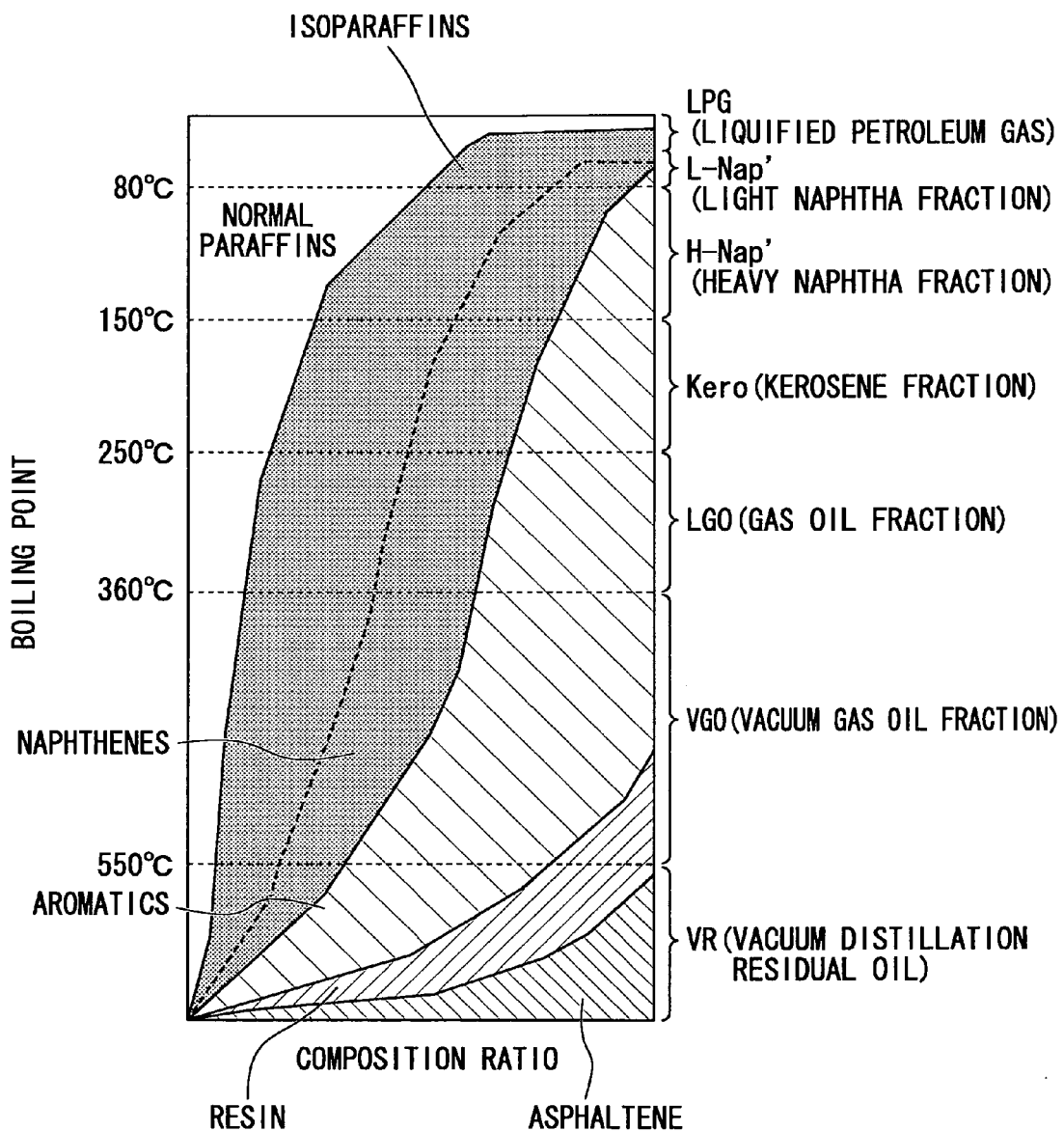
FIG. 6 is an explanatory view showing an example of the composition of crude oil.

Next, the composition of the crude oil (mineral-based crude oil) drilled from the ground or the like is shown in FIG. 6. In addition, since the composition of the crude oil has deviations according to drilling areas, an example of the composition of typical crude oil is shown in FIG. 6. As shown in FIG. 6, in the crude oil, various components are contained, and especially, the content of the heavy normal paraffins tends to be small. For this reason, the composition of this crude oil is greatly different from the composition of the FT synthesis oil shown in FIG. 3, and the properties of this crude oil are also completely different therefrom.

Figure 7:
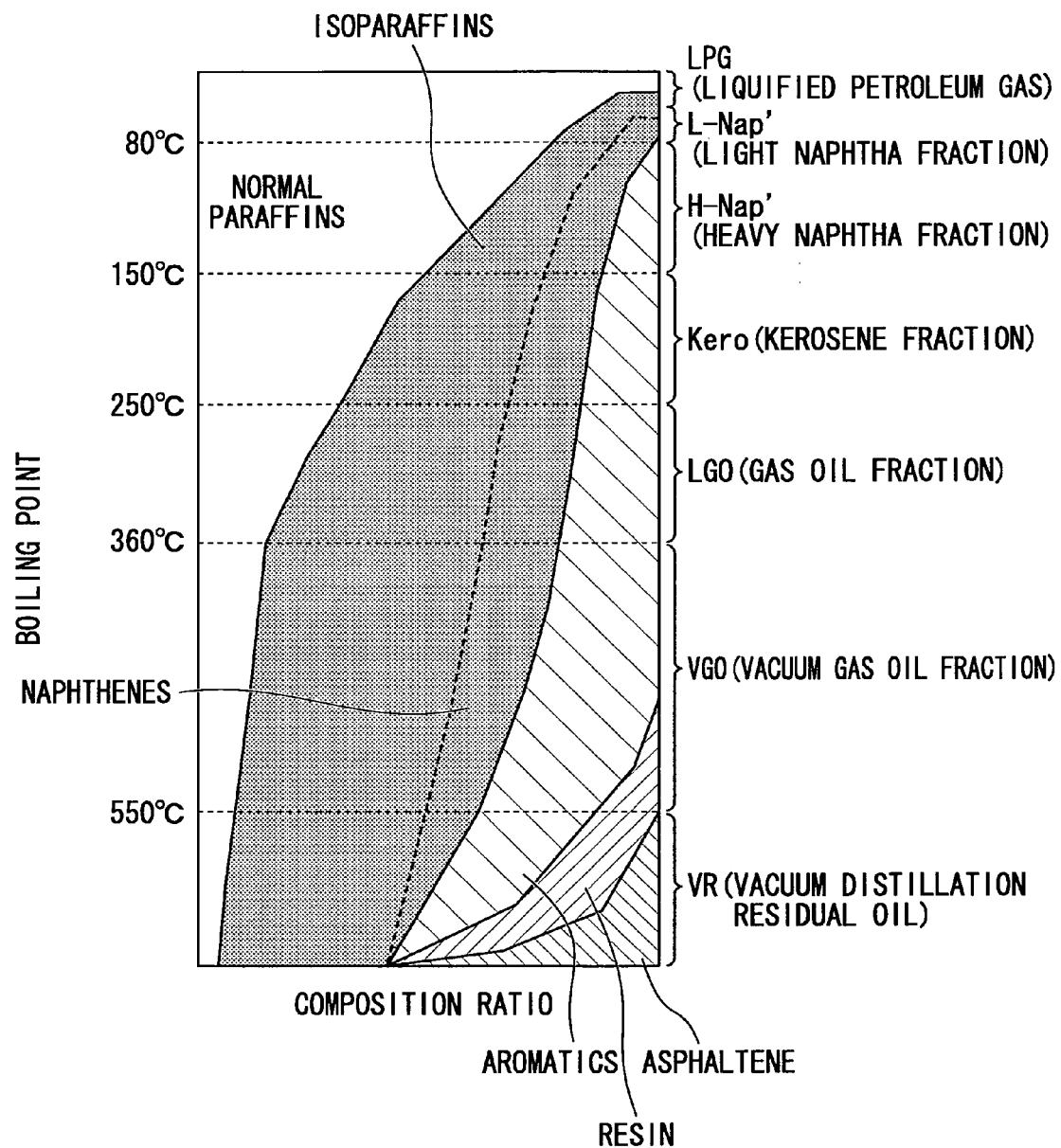
FIG. 7 is an explanatory view showing the composition of a mixed crude oil (the content of the hydroisomerized synthesis oil is 50 mass %) obtained by mixing the hydroisomerized synthesis oil and the crude oil.

Also, the composition of a mixed crude oil obtained by mixing the hydroisomerized synthesis oil shown in FIG. 4 with the crude oil shown in FIG. 6 is shown in FIG. 7. In addition, the mixed ratio is set to Hydroisomerized synthesis oil: Crude oil=50:50 (mass ratio). In the hydroisomerized synthesis oil, especially the heavy normal paraffins are converted into isoparaffins. Thus, it can be understood that the composition of the mixed crude oil, as shown in FIG. 7, does not greatly change from the composition of the original crude oil.

In the method for upgrading FT synthesis oil and the mixed crude oil according to the present embodiment having the above-described configuration, the FT synthesis oil synthesized in the FT synthesis unit 5 is hydroisomerized so that at least a portion of the normal paraffins with a carbon number of 5 or more is converted into isoparaffins, as well as alcohols and olefins included in the FT synthesis oil are removed, and the hydroisomerized synthesis oil is obtained. Here, it is possible to adjust the content ratio of the normal paraffins and the isoparaffins in the hydroisomerized synthesis oil by controlling the degree of the hydroisomerization. For this reason, it is possible to adjust the composition and properties of the hydroisomerized synthesis oil in consideration of the composition and properties of the crude oil to be mixed, and the mixed crude oil can be prevented from being greatly different from the composition and properties of the original crude oil.

Also, since the aforementioned mixed crude oil is transferred to and refined in the crude oil distillation unit 91 of the refinery, it is possible to produce liquid fuels, such as gasoline, kerosene, gas oil, and heavy oil, and various products, such as wax and asphalt, through ordinary processing in the refinery from the FT synthesis oil.

Additionally, the freezing point of the hydroisomerized synthesis oil produced in the hydroisomerization reactor 82 (hydroisomerization step S3) is set to 60° C. or lower. Therefore, in this hydroisomerized synthesis oil, fluidity is kept even at a temperature near ambient temperature, transfer with a pump and the like becomes possible, and ease of handling is significantly improved.

Moreover, since the content of the normal paraffins with a carbon number of 20 or more in the aforementioned hydroisomerized synthesis oil is set to 40 mass % or less, the freezing point of the hydroisomerized synthesis oil can be lowered, and the fluidity thereof can be kept. Moreover, the properties of the mixed crude oil can be kept from being greatly different from the properties of the original crude oil, and the mixed crude oil can be appropriately processed in the refinery unit 9.

Moreover, in the crude oil mixing step S3, the hydroisomerized synthesis oil can be mixed in an arbitrary ratio with respect to the mixed crude oil. However, in the present embodiment, since the content of the hydroisomerized synthesis oil is 50 mass %, the amount of the used FT synthesis oil is kept sufficient, and the mixed crude oil can be refined in the ordinary refinery unit 9 without a great difference in the properties thereof from those of the original crude oil. Thereby, it is possible to produce liquid fuels, such as gasoline, kerosene, gas oil, and heavy oil, and various products, such as wax and asphalt.

Although the embodiment of the present invention has been described hitherto in detail with reference to the drawings, specific configurations are not limited to the embodiment, and the present invention also includes design changes which do not depart from the spirit of the present invention.

For example, the configuration in which the heavy component of the FT synthesis oil is drawn via the separator of the FT synthesis unit, the light component of the FT synthesis oil is drawn via the vapor-liquid separator, and these components are brought to the mixed crude oil production unit has been described. However, the present invention is not limited to this, and the FT synthesis oil may not be divided into the heavy component and the light component in the FT synthesis unit, but may be brought to the mixed crude oil production unit.

Figure 8:
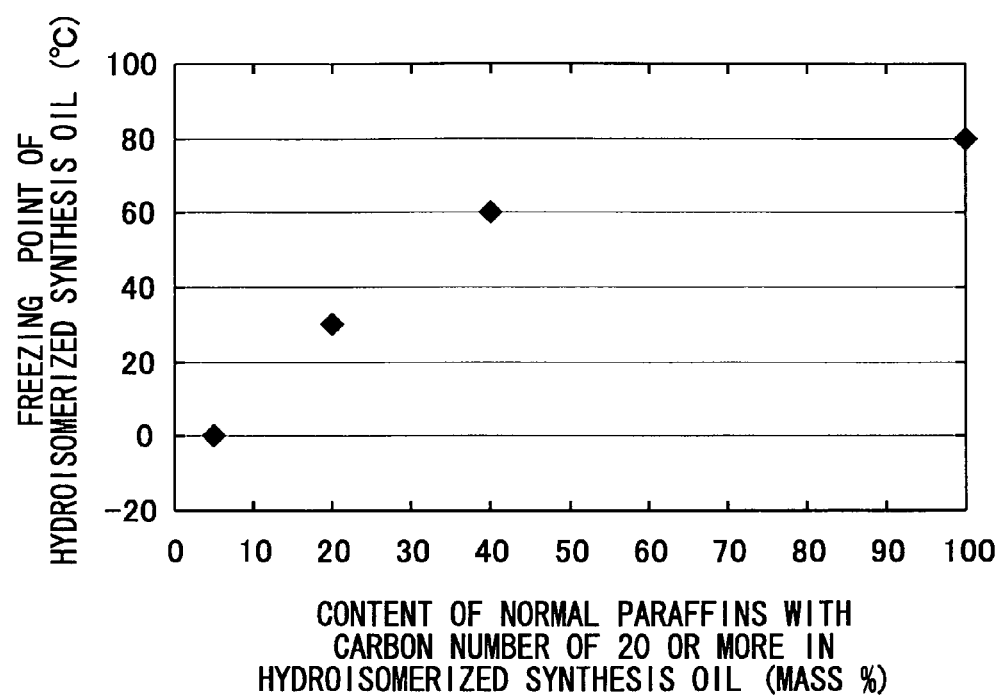
FIG. 8 is a graph showing the relationship between the content of normal paraffins with a carbon number of 20 or more in the hydroisomerized synthesis oil and the freezing point thereof.

Moreover, the configuration in which the freezing point of the hydroisomerized synthesis oil is set to 60° C. or lower, and the content of the normal paraffins with a carbon number of 20 or more is set to 40 mass % or less has been described. However, the present invention is not limited to this. Here, FIG. 8 shows the relationship between the content of the normal paraffins with a carbon number of 20 or more in the hydroisomerized synthesis oil and the freezing point thereof. In the hydroisomerized synthesis oil, it is possible to adjust the freezing point by changing the content of the normal paraffins with a carbon number of 20 or more. Hence, it is preferable to adjust the freezing point of hydroisomerized synthesis oil and the content of the normal paraffins with a carbon number of 20 or more in consideration of the composition and properties of crude oil to be mixed, and the configuration of the refinery unit 9, the transferring means, and so on.

Figure 9:
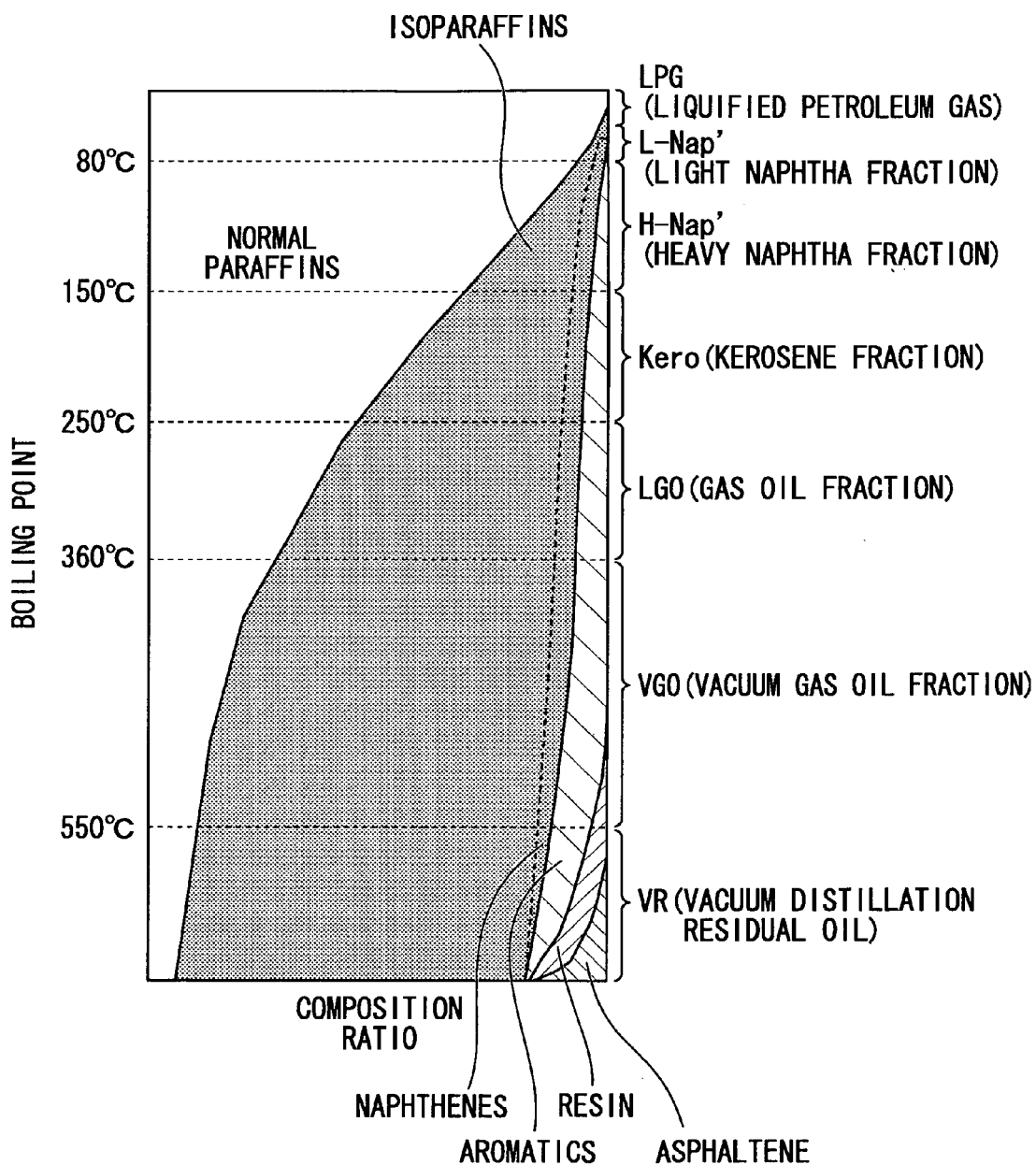
FIG. 9 is an explanatory view showing the composition of a mixed crude oil (the content of the hydroisomerized synthesis oil is 90 mass %) obtained by mixing the hydroisomerized synthesis oil and the crude oil.
Figure 10:
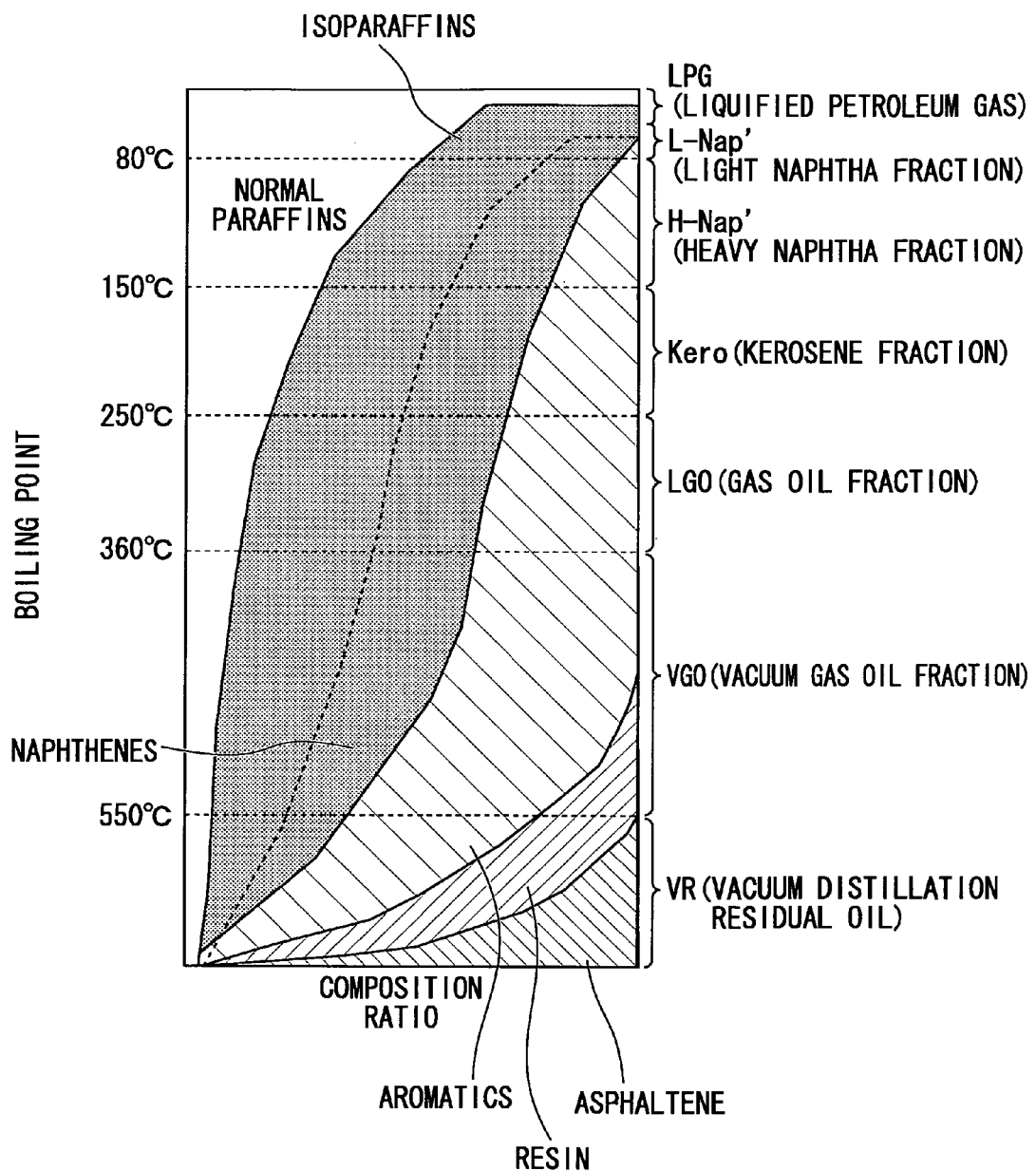
FIG. 10 is an explanatory view showing the composition of a mixed crude oil (the content of the hydroisomerized synthesis oil is 10 mass %) obtained by mixing the hydroisomerized synthesis oil and the crude oil.

Moreover, although the configuration in which the content of the hydroisomerized synthesis oil in the mixed crude oil is set to 50 mass % has been described, the present invention is not limited to this. Here, the composition of the mixed crude oil in a case where the content of the hydroisomerized synthesis oil is 90 mass % is shown in FIG. 9, and the composition of the mixed crude oil in a case where the content of the hydroisomerized synthesis oil is 10 mass % is shown in FIG. 10. By adjusting the content of the hydroisomerized synthesis oil in the mixed crude oil in this way, it is possible to adjust the composition of the mixed crude oil. Hence, it is preferable to suitably determine the content of the hydroisomerized synthesis oil in consideration of the composition and properties of crude oil to be mixed, and the configuration of the refinery unit 9, the transfer means, and so on.

Additionally, the composition of the FT synthesis oil and the composition of the crude oil are not limited to the compositions shown in the present embodiment, and FT synthesis oil and crude oil of various compositions can be used.

Moreover, the configurations of the synthesis gas production unit and FT synthesis unit are also not limited to those of the present embodiment, and the FT synthesis oil may be synthesized by synthesis gas production units and FT synthesis units of other configurations.

[Industrial Applicability]

According to the method for upgrading an FT synthesis oil and the mixed crude oil of the present invention, it is possible to produce liquid fuels and other products from the FT synthesis oil obtained by the FT synthesis reaction by using facilities of an existing refinery without requiring large-scale special facilities, and it is possible to obtain a mixed crude oil composed of the FT synthesis oil with high content and crude oil, capable of being processed in the facilities of the above refinery.

REFERENCE SIGNS LIST

1: FT SYNTHESIS OIL UPGRADING SYSTEM
3: SYNTHESIS GAS PRODUCTION UNIT
5: FT SYNTHESIS UNIT
8: MIXED CRUDE OIL PRODUCTION UNIT
9: REFINERY UNIT
82: HYDROISOMERIZATION REACTOR
83: CRUDE OIL SUPPLY SECTION
84: MIXING TANK
91: CRUDE OIL DISTILLATION UNIT

The invention claimed is:

1. A method for upgrading a synthesis oil synthesized by the Fisher-Tropsch synthesis reaction, the method comprising:
   a hydroisomerization step of hydroisomerizing the synthesis oil to convert at least a portion of normal paraffins with a carbon number of 5 or more into isoparaffins as well as to convert alcohols and olefins into paraffins, and to obtain a hydroisomerized synthesis oil;
   a crude oil mixing step of mixing the hydroisomerized synthesis oil with a crude oil to obtain a mixed crude oil;
   a mixed crude oil transferring step of transferring the mixed crude oil to a crude oil distillation unit of a refinery; and
   a mixed crude oil refining step of processing the transferred mixed crude oil in petroleum refining facilities of the refinery including at least the crude oil distillation unit;
   wherein a content ratio of the normal paraffins and the isoparaffins in the hydroisomerized synthesis oil is adjusted in the hydroisomerization step, based on the composition and properties of the crude oil.

2. The method for upgrading a synthesis oil according to claim 1,
   wherein the freezing point of the hydroisomerized synthesis oil is set to 60° C. or lower in the hydroisomerization step.

3. The method for upgrading a synthesis oil according to claim 1 or 2,
   wherein the content of the normal paraffins with a carbon number of 20 or more in the hydroisomerized synthesis oil is set to 40 mass % or less on the basis of the mass of the hydroisomerized synthesis oil in the hydroisomerization step.

* * * * *